United States Patent
Hayashi et al.

[11] Patent Number: 5,968,684
[45] Date of Patent: Oct. 19, 1999

[54] NICKEL POSITIVE ELECTRODE FOR ALKALINE RECHARGEABLE BATTERIES AND NICKEL METAL HYDRIDE CELLS

[75] Inventors: Kiyoshi Hayashi; Katsuyuki Tomioka; Nobuyasu Morishita, all of Toyohashi; Masakazu Ikeyama, Katano; Munehisa Ikoma, Toyohashi, all of Japan

[73] Assignee: Matsushita Electric Industrial Co., Ltd., Osaka, Japan

[21] Appl. No.: 08/918,185

[22] Filed: Aug. 21, 1997

[30] Foreign Application Priority Data

Aug. 21, 1996 [JP] Japan .................................. 8-219585

[51] Int. Cl.$^6$ ...................................................... H01M 4/32
[52] U.S. Cl. ................................ 429/223; 429/218.1
[58] Field of Search .................... 429/223, 231.3, 429/229

[56] References Cited

U.S. PATENT DOCUMENTS

| | | | |
|---|---|---|---|
| 5,681,673 | 10/1997 | Hattori et al. | 429/235 |
| 5,744,259 | 4/1998 | Ohta et al. | 429/59 |
| 5,827,494 | 10/1998 | Yano et al. | 423/594 |

FOREIGN PATENT DOCUMENTS

| | | | |
|---|---|---|---|
| 62066570 | 3/1987 | European Pat. Off. | H01M 4/52 |
| 0 587 973 | 3/1994 | European Pat. Off. | |
| 0 744 781 | 11/1996 | European Pat. Off. | |

*Primary Examiner*—Maria Nuzzolillo
*Assistant Examiner*—Monique M. Wills
*Attorney, Agent, or Firm*—Ratner & Prestia

[57] ABSTRACT

In the paste type nickel positive electrode prepared by filling pores of a metal nickel plaque made of three-dimensional high porous sheet, or coating both sides or one side of a plaque made of either perforated nickel sheet or nickel plated steel sheet, with a paste type active material mainly composed of nickel hydroxide, by adding particles of cobalt hydroxide having the specific surface area of at least 10 $m^2/g$, average particle size of 1.7 microns or more, and content of fine particles with particle size of 1.0 micron or less of 20% or less, the utilization of positive electrode active material is enhanced, and by using this nickel positive electrode, the alkaline rechargeable battery, in particular, the nickel-metal hydride alkaline battery is enhanced in capacity and extended in service life.

16 Claims, 3 Drawing Sheets

NICKEL POSITIVE ELECTRODE FOR ALKALINE RECHARGEABLE BATTERIES AND NICKEL METAL HYDRIDE CELLS

BACKGROUND OF THE INVENTION

1. Field of the Invention

The present invention relates to a nickel positive electrode for alkaline rechargeable batteries, and alkaline rechargeable batteries using the same positive electrode, more particularly nickel-metal hydride (Ni—MH) batteries.

2. Description of the Prior Art

Alkaline rechargeable batteries are batteries using alkaline electrolyte mainly composed of potassium hydroxide (KOH), and in almost all battery systems, the nickel positive electrode excellent in charge and discharge cycle performance is used. In the negative electrode, iron (Fe), zinc (Zn), cadmium (Cd) and others are used as active material, but because of the long charge and discharge cycle life and high reliability of sealed batteries, the main stream of alkaline batteries was nickel-cadmium (Ni—Cd) batteries using Cd negative electrode. Recently, using a hydrogen absorbing alloy capable of repeating absorption and desorption of hydrogen by charge and discharge, higher in capacity than in Cd negative electrode, in the negative electrode, the Ni—MH batteries are developed, and are expanding demands. In particular, they are expected to be applied widely, ranging from the small-sized power supply for portable appliances such as cellular telephone and camcorder, to large- and medium-sized power supply for electric vehicle (EV) and hybrid electric vehicle (HEV).

In these alkaline rechargeable batteries, in order to reduce further in size and weight, it is always demanded to enhance the energy density. Means for increasing the capacity to enhance the energy density in a specific battery system may be roughly classified into two types. First, in limited battery dimensions, the inner volume of the battery container is expanded as much as possible, while the volume of the materials and parts not directly responsible for charge and discharge reaction is decreased, and the active materials of the positive and negative electrodes contributing to reaction are used in good balance and as much as possible. For example, in the cylindrical cell, using the so-called DI can having a thick bottom and a thin side wall, the inner volume of the cell is expanded, and a thin separator is used, so that the occupied volume of positive and negative electrodes is increased. Hitherto, owing to the excellent high rate discharge characteristics and long life, using a thin porous sheet by sintering carbonyl nickel (Ni) powder as plaque, sintered electrodes having active materials impregnated therein were widely used, and by contrast, it has been attempted to increase the filling amount of active materials and enhance the capacity by employing foamed type electrodes filled with paste type active materials, using a foamed Ni sheet extremely high in porosity and large in pore volume as plaque, coated type electrodes coated with paste type active materials on one or both sides of a plaque which is a perforated Ni sheet or Ni plated steel sheet such as punching metal and expanded metal, and other paste type electrodes.

Other means for enhancing the capacity is to increase the of utilization of active materials of positive and negative electrodes contained in the cell. Herein, the utilization of active materials is expressed by percentage of the practical capacity to theoretical capacity of the contained active materials.

Cobalt (Co) is noted as one of effective additives for enhancing the utilization of nickel hydroxide, $Ni(OH)_2$, an active material of paste type nickel positive electrode of foamed type or coated type. Various methods of its addition have been proposed. Typical examples include the following: (1) a method of adding cobalt monoxide (CoO) (Japanese Laid-Open Patent Application No. Sho. 61-138458), (2) a method of adding at least one of CoO with particle size of ½ or less of the particle of $Ni(OH)_2$ of active material, beta- and alpha-cobalt hydroxide, and $Co(OH)_2$ (Japanese Laid-Open Patent Application No. Sho. 62-256366), and (3) a method of adding $Co(OH)_2$ with specific surface area of 20 $m^2/g$ or less (Japanese Laid-Open Patent Application No. Sho. 62-66570), among others.

In the method of (1), CoO is easily oxidized in air, and is unstable and hard to handle. Yet, the addition effect of CoO is not exhibited unless it is let stand for a long time until the initial charge after composing the cell by injecting by using the nickel positive electrode to which CoO is added, and there was a problem in productivity.

In the method of (2), it is necessary to control the crystal structure of $Co(OH)_2$ of the additive, and there was a problem in supply of materials.

In the method of (3), when the specific surface area of $Co(OH)_2$ added for effectively enhancing the utilization of active materials of nickel positive electrode is increased nearly to 20 $m^2/g$, it becomes unstable in air. To the contrary, by using $Co(OH)_2$ of smaller specific surface area, the addition amount must be increased in order to enhance the utilization of positive electrode active material, which causes to increase the manufacturing cost.

SUMMARY OF THE INVENTION

The invention relates to a method of addition of Co for enhancing the utilization of active material of $Ni(OH)_2$ of paste type nickel positive electrode, and it has been succeeded in enhancing the capacity of nickel positive electrode, extending the life, and reducing the cost, by relatively suppressing the addition amount of the expensive $Co(OH)_2$, and enhancing the utilization of $Ni(OH)_2$ active material effectively. It is hence an object thereof to present an alkaline rechargeable battery of high capacity, more particularly, Ni—MH battery of high capacity. More specifically, a paste type nickel positive electrode is composed by filling a plaque of three-dimensional porous sheet made of metal nickel with paste type active material mainly made of nickel hydroxide, or coating both sides or one side of a plaque of perforated nickel sheet or nickel plated steel sheet, and its object is achieved by the nickel positive electrode for alkaline rechargeable battery by adding particles of cobalt hydroxide with specific surface area of at least 10 $m^2/g$, average particle size of 1.7 microns or more, and content of fine particles of 1.0 microns or less by 20% or less, to the paste type active material. Using this Ni positive electrode, by composing the alkaline rechargeable battery, especially Ni—MH system sealed battery, injection amount, and positive and negative electrode capacity ratio, an alkaline rechargeable battery of high capacity and long life can be presented.

DETAILED DESCRIPTION OF THE INVENTION

Embodiments

Referring now to the drawings and tables, embodiments of the invention are described in detail below.

Embodiment 1

A foamed Ni plaque with porosity of 95%, surface density (weight per unit area) of 300 g/m$^2$, thickness of 2.9 mm, and dimensions of 60×81 mm is filled with a paste type active material mainly composed of powder of spherical Ni(OH)$_2$ with average particle size of 10 microns, dried at 80° C., and pressed to a thickness of 1.74 mm, and a positive electrode is prepared. A lead tab of Ni sheet is spot-welded to the upper end of one side of this positive electrode. The foamed Ni plaque is a three-dimensional sponge-like porous structure, and communicating pores in the pore size of tens to hundreds of microns are formed. The composition of the paste type active material is, by weight, Ni(OH) powder: Co(OH)$_2$ powder: metal Co powder: zinc oxide (ZnO) powder: calcium fluoride (CaF$_2$) powder=100:5:7:3:3, and a specified amount of water is added to the mixed powder, and it is mixed and prepared.

Figure 1:
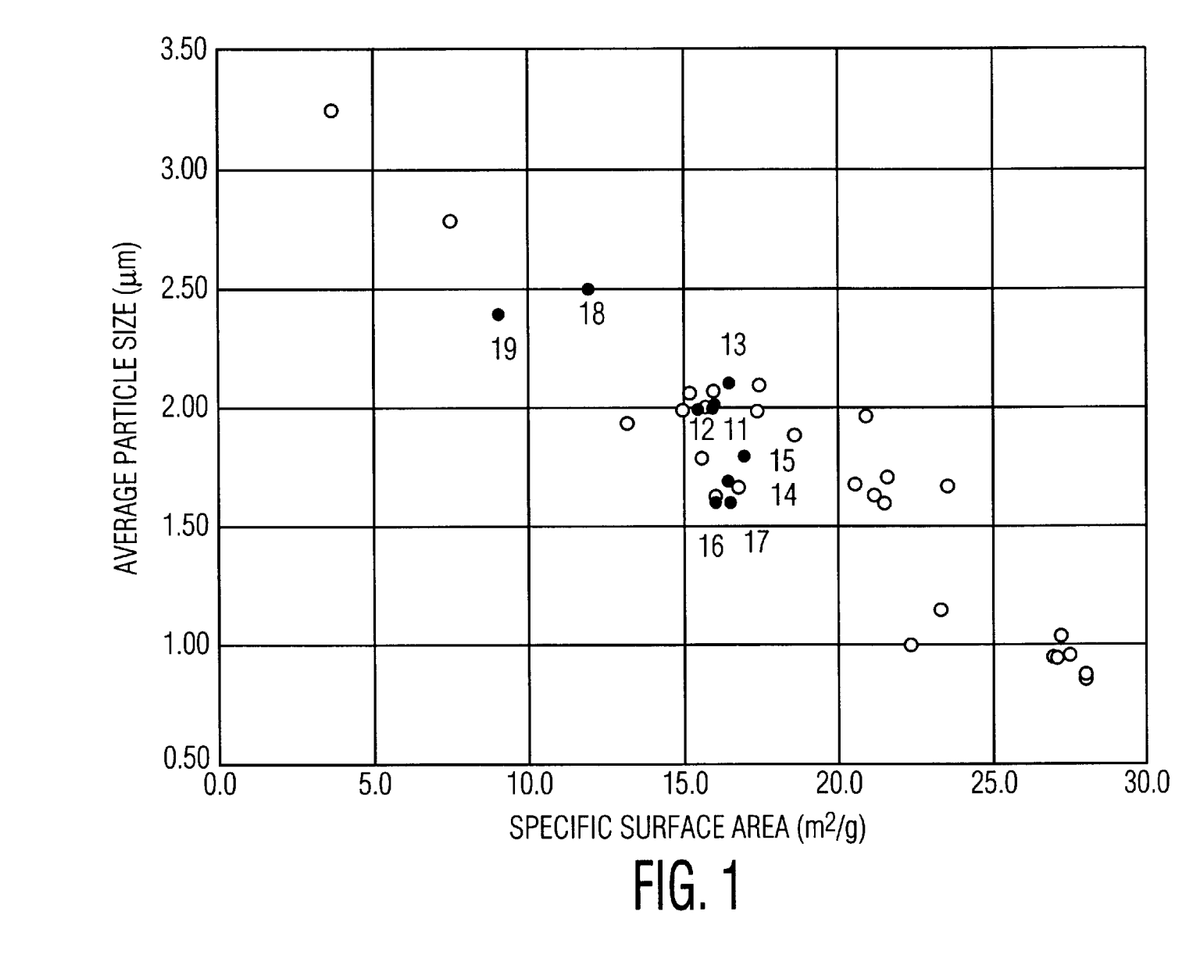
FIG. 1 is a diagram showing the relation of average particle size and specific surface area of $Co(OH)_2$ to be added to the positve electrode.

The additive, Co(OH)$_2$, was prepared by mixing an aqueous solution of cobalt sulfate(CoSO$_4$) and an aqueous solution of sodium hydroxide (NaOH), and depositing and precipitating. By controlling the temperature and pH at various levels while preparing, various particle sizes of Co(OH)$_2$ were prepared. The relation between the average particle size and specific surface area of Co(OH)$_2$ is shown in FIG. 1. Numerals in FIG. 1 refer to test cell numbers, and Table 1 shows the average particle size of the Co(OH)$_2$ added to the positive electrode, content of fine particles with particle size of 1.0 micron or less, and specific surface area.

TABLE 1

| Cell No. | Average particle size (μm) | Content of fine particles with particle size of 1.0 μm or less (%) | Specific surface area (m$^2$/g) |
| --- | --- | --- | --- |
| 11 | 2.0 | 16.0 | 16.0 |
| 12 | 2.0 | 20.5 | 15.5 |
| 13 | 2.1 | 19.5 | 16.5 |
| 14 | 1.7 | 19.0 | 16.5 |
| 15 | 1.8 | 21.0 | 17.0 |
| 16 | 1.6 | 22.5 | 16.0 |
| 17 | 1.6 | 19.5 | 16.5 |
| 18 | 2.5 | 10.5 | 12.0 |
| 19 | 2.4 | 8.5 | 9.0 |

From FIG. 1 and Table 1, it is understood that the specific surface area tends to increase as the average particle size of Co(OH)$_2$ becomes smaller.

Figure 2:
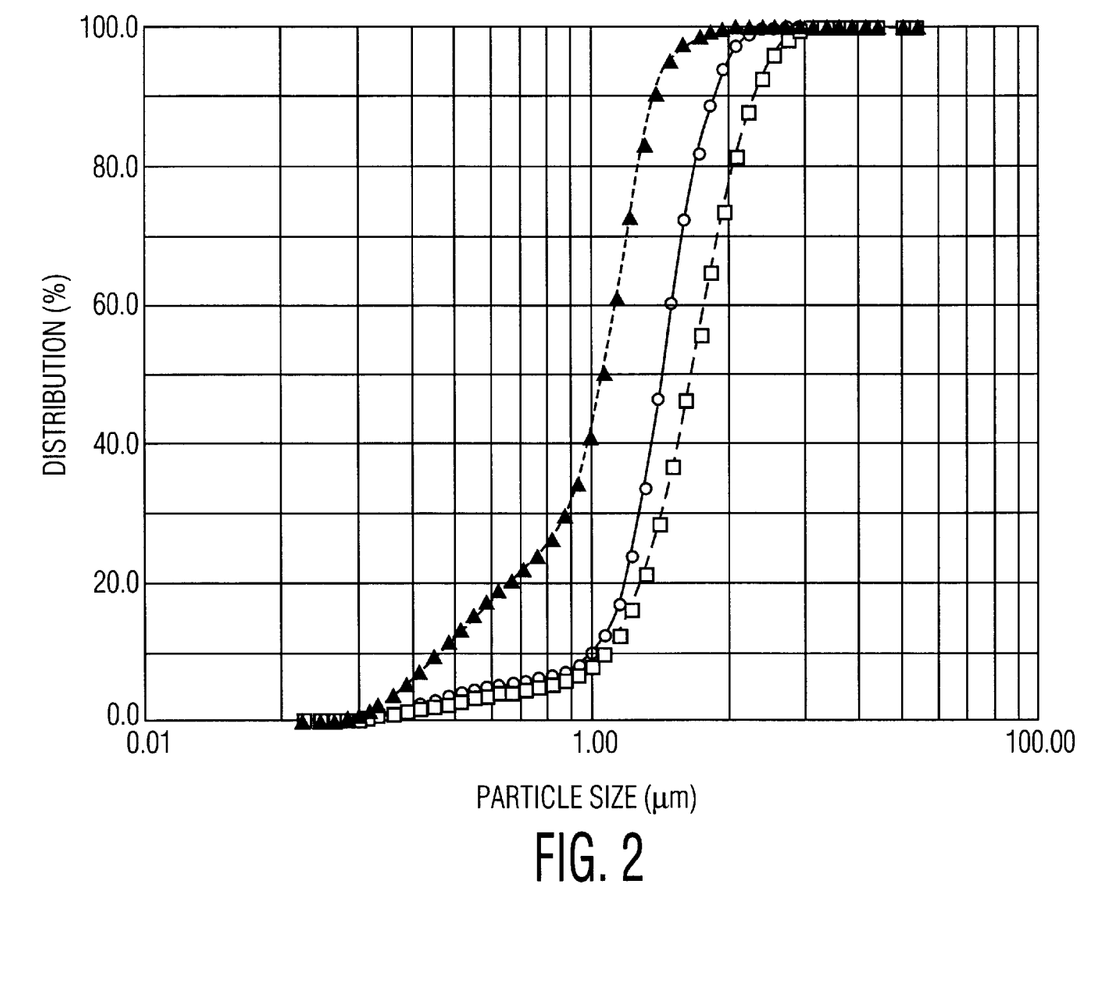
FIG 2. shows a representative example of particle size distribution of $Co(OH)_2$ to be added to the positive electrode.

A representative example of particle size distribution of prepared Co(OH)$_2$ is shown in FIG. 2.

The dispersion state of the Co(OH)$_2$ additive in the paste type active material of the positive electrode in the above composition was discussed by measuring the average particle size of the paste type active material. By way of comparison, a paste type active material of Ni(OH)$_2$ only without Co(OH)$_2$ was measured as blank test. Results are shown in Table 2.

TABLE 2

| Cell No. | Average particle size (μm) |
| --- | --- |
| Blank | 10.3 |
| 11 | 9.7 |
| 12 | 10.7 |
| 13 | 9.8 |
| 14 | 9.9 |
| 15 | 10.5 |
| 16 | 11.5 |
| 17 | 10.8 |
| 18 | 9.5 |
| 19 | 9.5 |

It is known from Table 2 that the average particle size of the paste type active material is increased due to coagulation of Co(OH)$_2$ added to the paste type active material of the positive electrode used in cell Nos. 12, 15, 16 and 17 having the larger average particle size than the blank. As shown in Table 1, if the average particle size is less than 1.7 microns, such as Co(OH)$_2$ used in the positive electrode of cell Nos. 16 and 17, regardless of the value of the content of fine particles of 1.0 micron or less in particle size, Co(OH)$_2$ seems to be easy to coagulate. Or, as in the case of Co(OH)$_2$ added to the positive electrode of cell Nos. 12, 15 and 16, when the content of fine particles of 1.0 micron or less in particle size is more than 20%, regardless of the value of the average particle size of Co(OH)$_2$, Co(OH)$_2$ is easy to aggregate, and it is hence understood that the average particle size of the paste type active material is increased.

Considering from these results, in order to suppress coagulation of Co(OH)$_2$ in the paste type active material of the positive electrode and disperse more uniformly, it is judged that the Co(OH)$_2$ to be added should be 1.7 microns or more in the average particle size, 20% or less in the content of fine particles of 1.0 micron or less in particle size, and at least 10 m$^2$/g in the specific surface area.

The negative electrode was prepared by filling a foamed Ni plaque weighing 3.1 g in the same dimensions as the positive electrode, with a mixed paste by adding binder and water to AB$_5$ type hydrogen absorbing alloy powder, drying, and pressing to a thickness of 1.20 mm. As the hydrogen absorbing alloy, misch metal (Mm) with lanthanum (La) content of 10 wt. % was used, in the composition expressed as MmNi$_{3.55}$Co$_{0.75}$Mn$_{0.4}$Al$_{0.3}$. In the negative electrode, too, same as in the positive electrode, a lead tab of Ni sheet is spot-welded. Using five positive electrodes and six negative electrodes, a prismatic sealed cell for test as shown in FIG. 3 was fabricated.

Figure 3:
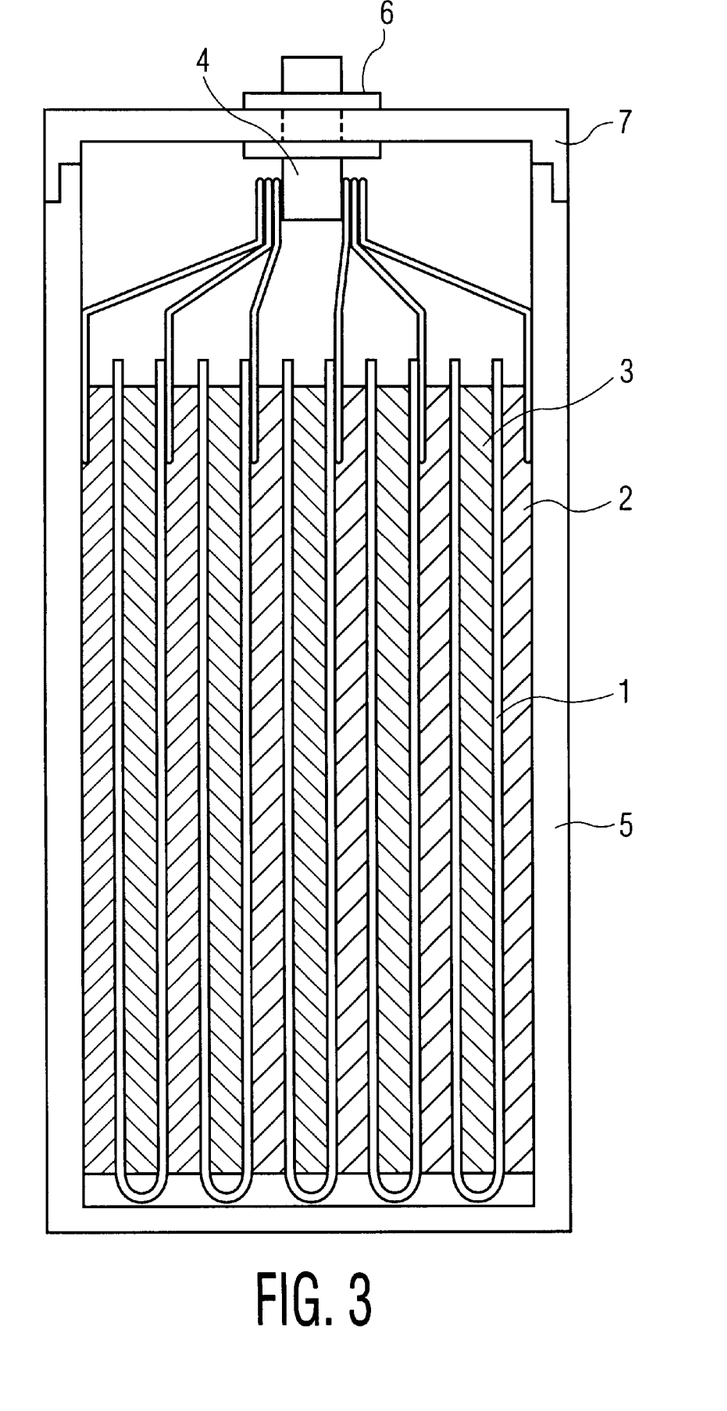
FIG. 3 is a longitudinal sectional view of a Ni—MH system prismatic sealed alkaline rechargeable battery in an embodiment of the invention.

In FIG. 3, negative electrodes 2 and positive electrodes 3 are alternately overlaid through a separator 1 made of a nonwoven cloth of hydrophilic treated polypropylene fibers by sulfonation, and an electrode group is composed so that the negative electrodes 2 may be located at both outer sides. Lead tabs of positive electrodes and negative electrodes are spot-welded to positive electrode terminals and negative electrode terminals 4 respectively, and the positive electrode terminals and negative electrode terminals 4 are fitted to a cover 7 of acrylonitrile-styrene (AS) copolymer resin through 0-rings by bush nuts 6, and fixed liquid-tightly and air-tightly. The electrode group fixed in the cover 7 is inserted and contained in a cell container 5 of the same material as the cover 7, with thickness of 3 mm, and internal dimensions of 108 mm in height, 69 mm in width, and 18 mm in length, and the opening upper edge of the cell container 5 and the cover 7 are adhered integrally by an epoxy resin. From an injection hole of the cover 7, an alkaline electrolyte of aqueous solution of potassium hydroxide (KOH) with specific gravity of 1.30 is injected by 54 ml (2.15 ml per 1 Ah of theoretical capacity of positive electrode), and is impregnated in the electrode group to fix. In the injection hole, a safety valve with operating pressure of $2.0265 \times 10^5$ Pa (2 atm) is fitted air-tightly for sealing, and a cell is completed.

In each test cell, the theoretical capacity of $Ni(OH)_2$ of positive electrode active material is adjusted at 25.1 Ah per cell, and the theoretical capacity of negative electrode is 1.5 times the theoretical capacity of positive electrode so that the discharge capacity of each cell may be limited by the positive electrode capacity.

These test cells were charged for 15 hours at 20° C. and $\frac{1}{10}$ $C_A$, and were discharged to an end voltage of 1.0 V at $\frac{1}{5}$ $C_A$, and the discharge capacity of the positive electrode was measured, and the utilization of the positive active material was determined in the following formula.

$$\text{Utilization of positive active material (\%)} = \frac{\text{discharge capacity (Ah)}}{25.1 \text{ Ah}} \times 100 \quad (1)$$

TABLE 3

| Cell No. | Utilization of $Ni(OH)_2$ (%) |
| --- | --- |
| 11 | 98.5 |
| 12 | 92.5 |
| 13 | 98.0 |
| 14 | 98.5 |
| 15 | 93.5 |
| 16 | 91.0 |
| 17 | 92.5 |
| 18 | 97.5 |
| 19 | 92.5 |

The determined utilization of $Ni(OH)_2$ of positive active material is shown in Table 3. As shown in Table 3, in cell Nos. 11, 13, 14 and 18, the utilization of $Ni(OH)_2$ active material is high. The relation is discussed herein about the properties of $Co(OH)_2$ added to the $Ni(OH)_2$ active material shown in Table 1, the dispersion state of $Co(OH)_2$ in the paste type active material estimated from the average particle size of the paste type active material shown in Table 2, and the utilization of positive active material shown in Table 3. What is common among the positive electrodes high in the utilization of $Ni(OH)_2$ active material is that the average particle size of $Co(OH)_2$ to be added is 1.7 microns or more, the content of fine particles of 1.0 micron or less in particle size is 20% or less, and the specific surface area is at least 10 $m^2/g$.

By adding $Co(OH)_2$ conforming to such condition, coagulation of $Co(OH)_2$ is suppressed, and $Co(OH)_2$ is sufficiently dispersed into the paste type active material, so that a network of excellent electron conduction is formed, which seems to have contributed to the utilization of $Ni(OH)_2$ active material.

As in cell No. 19, when the average particle size of the added $Co(OH)_2$ is 1.7 microns or more, the content of fine particles with 1.0 micron or less in particle size is 20% or less, and the specific surface area is as low as 9.0 $m^2/g$, $Co(OH)_2$ cannot be dispersed sufficiently in the paste type active material, and network of excellent electron conduction is not formed, which seems because the utilization of $Ni(OH)_2$ active material was not raised.

As described herein, $Co(OH)_2$ to be added to the positive electrode is required to be at least 10 $m^2/g$ in the specific surface area, 1.7 microns or more in the average particle size, and 20% or less in the content of fine particles of 1.0 micron or less in particle size. As confirmed from many other test results, preferably, the specific surface area should be at least 10 $m^2/g$, the average particle size be 1.9 microns or more, and the content of fine particles with particle size of 1.0 microns or less be 15% or less, and more preferably at the average particle size of 2.0 microns or more and the content of fine particles with particle size of 1.0 micron or less of 10% or less, the aggregation of $Co(OH)_2$ is further suppressed, and the dispersion is excellent, and if the addition amount is small, the utilization of $Ni(OH)_2$ active material can be enhanced effectively.

As the positive active material, $Ni(OH)_2$ is used, and since the filling density can be heightened, as known widely, it is preferred to use the spherical $Ni(OH)_2$. At least one of magnesium (Mg), cobalt (Co), zinc (Zn) and cadmium (Cd) should be contained in the spherical $Ni(OH)_2$ particles, or the $Ni(OH)_2$ particle surface may be preliminarily coated with $Co(OH)_2$. The addition method of $Co(OH)_2$ by the invention may be also applied to the compound by adding at least one of metal Ni powder, metal Co powder, carbon powder and CoO powder to $Ni(OH)_2$.

Instead of ZnO, an additive to the paste type active material in embodiment 1, zinc hydroxide $Zn(OH)_2$ can be also used, and same effects are obtained.

Besides, $CaF_2$, other additive to the paste type active material in embodiment 1 may be also replaced by at least one type selected from the group consisting of yttrium (Y) compound, such as yttrium oxide $Y_2O_3$ and yttrium hydroxide $Y(OH)_3$; indium (In) compound, such as various indium oxides $In_2O_3$, $In_2O$, $In_2O_3 \cdot H_2O$; antimony (Sb) compound, such as antimony oxides $Sb_2O_3$ and $Sb_2O_4$ (or $SbO_2$); barium (Ba) compound, such as barium hydroxide $Ba(OH)_2$; calcium (Ca) compound aside from $CaF_2$, such as calcium sulfide CaS, calcium oxide CaO, and calcium hydroxide $Ca(OH)_2$; and beryllium (Be) compound, such as beryllium oxide BeO and beryllium hydroxide $Be(OH)_2$.

In embodiment 1, as the plaque to fill the paste type active material, a foamed Ni plaque with weight per unit area of 300 $g/m^2$ is shown, and in the case of the foamed Ni plaque, the practical range of weight per unit area is 200 to 700 $g/m^2$. Aside from such foamed Ni plaques, the invention-may applied also to other plaques composed of felt-like porous sheet made of Ni fibers, and other high porous sintered Ni sheet, having, for example, a mixture of Ni powder and pore forming agent adhered to both sides of the grid of perforated Ni sheet or Ni plated steel sheet such as punching and expanded methods, drying and sintering, and forming three-dimensional communicating pores in the pore size of tens to hundreds of microns.

Aside from these Ni plaques composed of three-dimensional porous sheets filled with paste type active material, the invention may be also applied preferably to the coated electrodes composed of plaques of perforated Ni sheet or Ni plated steel sheet such as punching metal and expanded metal, having the both sides or one side coated with paste type active material containing much binder.

Embodiment 2

Using the foamed Ni positive electrode in the same composition as in embodiment 1, and the foamed MH negative electrode using hydrogen absorbing alloy in the same composition as in embodiment 1, the effects of adding $Co(OH)_2$ of different powder properties to the positive active material were reconfirmed same as in embodiment 1, and the KOH concentration (specific gravity) of alkaline electrolyte and its injection amount (liquid amount per 1 Ah of theoretical capacity of positive electrode), the utilization of $Ni(OH)_2$ active material in initial cycle by theoretical capacity ratio of positive and negative electrode, and effects on cycle life were investigated. The theoretical capacity of positive electrode active material $Ni(OH)_2$ was adjusted to 25.1 Ah same as in embodiment 1.

Composition conditions of test cells are summarized in Table 4.

low same as in embodiment 1. The cell low in the utilization of $Ni(OH)_2$ active material in initial cycle was also known to be shorter in cycle life. This is considered because the dispersion of $Co(OH)_2$ in the positive electrode is poor, forming of network of $Co(OH)_2$ of high conductivity is insufficient, swelling of positive electrode occurs due to non-uniform reaction by charge and discharge cycle, and the electrolyte drys up.

As in cell Nos. 23 to 32, if the $Co(OH)_2$ added to the positive electrode has the specific surface area of 16.0 $m^2/g$ (at least 10 $m^2/g$), the average particle size of 2.0 microns

TABLE 4

| | Positive electrode additive $Co(OH)_2$ | | | Alkaline electrolyte | | Theoretical capacity |
| --- | --- | --- | --- | --- | --- | --- |
| | Average | Content of fine | Specific | | | |
| Cell No. | particle size ($\mu m$) | particle of particle size 1 $\mu m$ or less (%) | surface area ($m^2/g$) | Specific gravity (at 20° C.) | Injection amount (ml/Ah) | ratio of negative electrode to positive electrode |
| 21 | 1.6 | 22.5 | 16.0 | 1.30 | 2.00 | 1.5 |
| 22 | 2.4 | 8.5 | 9.0 | | | |
| 23 | 2.0 | 16.0 | 16.0 | | | |
| 24 | | | | 1.15 | | |
| 25 | | | | 1.20 | | |
| 26 | | | | 1.35 | | |
| 27 | | | | 1.30 | 0.95 | |
| 28 | | | | | 1.00 | |
| 29 | | | | | 2.50 | |
| 30 | | | | | 3.00 | |
| 31 | | | | | 2.00 | 1.0 |
| 32 | | | | | | 1.1 |

Same as in embodiment 1, by charging for 15 hours at 20° C. and $1/10$ $C_A$, and discharging up to end voltage of 1.0 V at $1/5$ $C_A$, the discharge capacity of the positive electrode was measured, and the utilization of $Ni(OH)_2$ active material was determined.

Afterwards, at the same 20° C., the cycle life test was conducted by repeating the cycle of charging for 1.3 hours at 1 $C_A$ rate and discharging at 1 $C_A$ rate up to end voltage of 1.0 V. The cycle life was evaluated by the number of charge and discharge cycles until the discharge capacity was lowered to 40% of the initial capacity. Table 5 shows the utilization of $Ni(OH)_2$ active material and the cycle life.

TABLE 5

| Cell No. | Utilization of $Ni(OH)_2$ (%) | Cycle life (cycles) |
| --- | --- | --- |
| 21 | 91.0 | 300 |
| 22 | 92.5 | 350 |
| 23 | 98.5 | 700 |
| 24 | 91.5 | 680 |
| 25 | 98.0 | 710 |
| 26 | 98.0 | 320 |
| 27 | 92.5 | 250 |
| 28 | 98.5 | 670 |
| 29 | 98.0 | 720 |
| 30 | 98.5 | 300 |
| 31 | 98.0 | 330 |
| 32 | 98.5 | 650 |

As in cell Nos. 21 and 22 in Table 5, unless the $Co(OH)_2$ added to the positive electrode satisfies the conditions of the specific surface area of at least 10 $m^2/g$, the average particle size of 1.7 microns or more, and the content of fine particles with particle size of 1.0 micron or less of 20% or less, the utilization of $Ni(OH)_2$ active material was reconfirmed to be (1.7 microns or more), and the content of fine particles with particle size of 1.0 micron or less of 16.0% (20% or less), the utilization of $Ni(OH)_2$ active material was not always high. As in cell No. 24, when the specific gravity of the alkaline electrolyte is 1.15, that is, the concentration of KOH is too low, the cycle life is relatively long, but the utilization of $Ni(OH)_2$ active material-is not high. By contrast, as in cell No. 26, when the specific gravity of the alkaline electrolyte is 1.35, that is, the concentration of KOH is too high, the utilization of $Ni(OH)_2$ active material is high, but the positive electrode tends to swell due to charge and discharge cycle, and the cycle life is shorter.

In cell Nos. 23, 24, 25 and 26 with the theoretical capacity of positive electrode of 2.00 ml per 1 Ah, in the cells high in utilization of $Ni(OH)_2$ active material and long in service life, an alkaline electrolyte composed of KOH aqueous solution with the specific gravity in a range of 1.20 to 1.30 should be used.

However, if a proper $Co(OH)_2$ is added to the positive electrode and an alkaline electrolyte with specific gravity of 1.30 is used, as in cell No. 27, when the injection amount is extremely small, 0.95 ml/Ah, the charge and discharge reaction is not promoted sufficiently, and the utilization of $Ni(OH)_2$ active material and the cycle life are both poor. Or, as in cell No. 30, when the injection amount is too much, 3.00 ml/Ah, the utilization of $Ni(OH)_2$ active material is high, but the cycle life is short. This is because the charge rate of cycle test is high due to excessive injection amount, and in the terminal stage of charge, the absorption speed of oxygen ($O_2$) gas on the negative electrode cannot catch up with the generation of $O_2$ gas from the positive electrode, and the cell internal pressure is raised, and it is exhausted. As a result, the electrolyte volume decreases, and the capacity balance of the positive and negative electrodes is broken, and the cycle life is shortened. Therefore, in the sealed Ni—MH battery, a proper injection amount seems to be 1.0 to 2.5 ml per 1 Ah of theoretical capacity of positive electrode.

Yet, the cycle life of cell No. 31 was not excellent. In the paste type Ni positive electrode using paste type active material as in this invention, aside from $Ni(OH)_2$ of active material, to enhance the utilization of this $Ni(OH)_2$, additives such as metal Co and $Co(OH)_2$ are added and mixed in the positive electrode. These additives have the charge accepting capacity together with $Ni(OH)_2$, and therefore, as in cell No. 31, when the theoretical capacity of the positive and negative electrode active materials is 1.0, the total charge accepting capacity of the positive electrode is consequently larger than that of the negative electrode. As a result, hydrogen ($H_2$) gas is generated earlier from the negative electrode, and the balance of positive and negative capacity as the sealed battery is broken, and the cycle life is shortened. Therefore, as known from Tables 4 and 5, in the sealed Ni—MH battery, the theoretical capacity of the negative electrode to the positive electrode must be at least 1.1 times.

As the separator of test cells in the embodiments, a nonwoven cloth of hydrophilic treated polypropylene fiber by sulfonation is shown, but other woven cloth of sulfonated polyolefin fiber can be used such as polyethylene fiber or mixed fiber of polyethylene and polypropylene.

In the embodiments, KOH aqueous solution is used as the alkaline electrolyte, but KOH and/or NaOH aqueous solution containing lithium hydroxide (LiOH) effective for enhancement of utilization of $Ni(OH)_2$ active material can be used similarly as far as the composition and injection amount are selected properly. The prismatic sealed batteries are mentioned in the description, but the invention is not directly related with the shape of the cell, and it may be also applied to cylindrical, oval or columnar cells.

Also in the embodiments, examples of sealed Ni—MH battery are described, but the invention is not limited to the Ni—MH system alone, but may be applied in many other battery systems, including the Ni—Cd system and the system using paste type Ni positive electrode.

As described herein, according to the invention, by adding $Co(OH)_2$ of adequate powder properties to $Ni(OH)_2$ and a mixture of $Ni(OH)_2$ and effective additives, the utilization of $Ni(OH)_2$ active material can be enhanced, and an alkaline rechargeable battery of large capacity and long life, in particular, Ni—MH system sealed alkaline battery is realized.

What is claimed is:

1. A nickel positive electrode for alkaline battery, being a paste type nickel electrode characterized by filling pores of a metal nickel plaque made of three-dimensional high porous sheet, or coating both sides or one side of a plaque made of either perforated nickel sheet or nickel plated steel sheet, with a paste type active material mainly composed of nickel hydroxide, wherein the paste type active material contains particles of cobalt hydroxide having the specific surface area of at least 10 $m^2$/g, average particle size of 1.7 µm or more, and content of fine particles with particle size of 1.0 µm or less of 20% or less.

2. A nickel positive electrode for alkaline battery of claim 1, wherein spherical nickel hydroxide is used as the active material.

3. A nickel positive electrode for alkaline battery of claim 1, wherein the plaque made of three-dimensional high porous sheet is any one of the sheets consisting of foamed nickel sheet, felt-like sheet made of nickel fibers, and sintered nickel sheet made by using of pore forming agent and grid made of either perforated nickel sheet or nickel plated steel sheet.

4. A nickel positive electrode for alkaline battery of claim 1, wherein the plaque is made of either nickel sheet or nickel plated steel sheet perforated by either punching method or expanding method.

5. A nickel positive electrode for alkaline battery of claim 1, wherein the plaque made of three-dimensional high porous sheet is a foamed nickel sheet with the weight per unit area of 200 to 700 g/$m^2$.

6. A nickel positive electrode for alkaline battery of claim 2, wherein at least one kind of paste type active material, selected from the group consisting of metal nickel powder, metal cobalt powder, carbon powder, and cobalt oxide powder, is added to the nickel hydroxide of active material.

7. A nickel positive electrode for alkaline battery of claim 2, wherein the paste type active material is prepared by adding either zinc oxide ZnO or zinc hydroxide $Zn(OH)_2$ to nickel hydroxide of the active material.

8. A nickel positive electrode for alkaline battery of claim 2, wherein at least one compound selected from the group consisting of a beryllium compound, a calcium compound, an yttrium compound, an indium compound, an antimony compound, and a barium compound, is added to the nickel hydroxide of the active material.

9. A nickel positive electrode for alkaline battery of claim 2, wherein the surface of nickel hydroxide particles of the active material is coated with cobalt hydroxide.

10. A nickel positive electrode for alkaline battery of claim 2, wherein at least one element selected from the group consisting of magnesium, cobalt, zinc and cadmium is contained in the nickel hydroxide particles of the active material.

11. A nickel positive electrode for alkaline battery of claim 9, wherein the paste type active material is prepared by adding, to nickel hydroxide of the active material, at least one material selected from the group consisting of a metal nickel powder, a metal cobalt powder, and a carbon powder, and at least one compound each selected from the group consisting of a beryllium compound, a calcium compound, a zinc compound, an yttrium compound, an indium compound, an antimony compound, and a barium compound, and also particles of cobalt hydroxide having the specific surface area of at least 10 $m^2$/g, average particle size of 1.7 µm or more, and content of fine particles with particle size of 1.0 µm or less of 20% or less.

12. A nickel-metal hydride battery, comprising a paste type positive electrode and a negative electrode mainly composed of hydrogen absorbing alloy capable of repeating the reaction of electrochemical absorption and desorption by charge and discharge, which are separated by a separator and using an alkaline electrolyte, wherein said paste type positive electrode is prepared by filling pores of a metal nickel plaque made of three-dimensional high porous sheet, or coating both sides or one side of a plaque made of either perforated nickel sheet or nickel plated steel sheet, with a paste type active material mainly composed of cobalt hydroxide having a specific surface area of at least 10 $m^2$/g, average particle size of 1.7 µm or more, and content of fine particles with particle size of 1.0 µm or less of 20% or less.

13. A nickel-metal hydride battery of claim 12, wherein the alkaline electrolyte is composed of potassium hydroxide aqueous solution of which specific gravity at 20° C. is 1.2 to 1.3.

14. A nickel-metal hydride battery of claim 12, wherein the separator is composed of a nonwoven cloth of at least one fiber of polyethylene and polypropylene treated to be hydrophilic by sulfonation.

15. A nickel-metal hydride battery of claim 12, wherein the injection amount of alkaline electrolyte is defined in a range of 1.0 to 2.5 ml per 1 Ah of theoretical capacity of positive electrode, and the theoretical capacity of negative electrode is at least 1.1 times the theoretical capacity of positive electrode so as to be sealed.

16. A nickel positive electrode for alkaline battery of claim 10, wherein the paste type active material is prepared by adding, to nickel hydroxide of the active material, at least one material selected from the group consisting of a metal nickel powder, a metal cobalt powder, and a carbon powder, and at least one compound each selected from the group consisting of a beryllium compound, a calcium compound, a zinc compound, an yttrium compound, an compound, an antimony compound, and a barium compound, and also particles of cobalt hydroxide having the specific surface area of at least 10 $m^2/g$, average particle size of 1.7 $\mu$m or more, and content of fine particles with particle size of 1.0 $\mu$m or less of 20% or less.

* * * * *

UNITED STATES PATENT AND TRADE MARK OFFICE
CERTIFICATE OF CORRECTION

PATENT NO. : 5,968,684
DATED : October 19, 1999
INVENTOR(S) : Hayashi et al.

It is certified that error appears in the above-identified patent and that said Letters Patent is hereby corrected as shown below:

Column 12, line 4, between "an" and "compound" insert --indium--.

Signed and Sealed this

Twenty-sixth Day of December, 2000

Attest:

Q. TODD DICKINSON

*Attesting Officer*          *Director of Patents and Trademarks*